(12) United States Patent
Carr

(10) Patent No.: US 8,602,731 B2
(45) Date of Patent: Dec. 10, 2013

(54) MICROPROCESSOR SYSTEM FOR CONTROLLING ROTOR PITCH

(76) Inventor: Fred K. Carr, Chapel Hill, NC (US)

( * ) Notice: Subject to any disclaimer, the term of this patent is extended or adjusted under 35 U.S.C. 154(b) by 33 days.

(21) Appl. No.: 13/374,727

(22) Filed: Jan. 11, 2012

(65) Prior Publication Data

US 2012/0114483 A1    May 10, 2012

Related U.S. Application Data

(63) Continuation of application No. 12/655,358, filed on Dec. 30, 2009, now abandoned.

(51) Int. Cl.
*F03B 15/06* (2006.01)
*F03B 3/06* (2006.01)
*F03B 3/14* (2006.01)

(52) U.S. Cl.
USPC ...... 416/1; 416/61; 416/31; 416/41; 416/155; 416/157 R; 416/162; 416/163; 416/164; 340/12.28; 340/13.25; 700/287; 700/290

(58) Field of Classification Search
USPC ........ 416/1, 61, 147, 155, 156, 157 R, 157 A, 416/158, 162–167, 168 R, 168 A, 31, 41; 340/12.22, 12.28, 13.24, 13.25; 700/275, 287, 290
See application file for complete search history.

(56) References Cited

U.S. PATENT DOCUMENTS

| | | | | |
|---|---|---|---|---|
| 1,890,932 A * | 12/1932 | Briner | ........................ | 416/166 |
| 3,331,446 A * | 7/1967 | Feroy | ........................ | 416/163 |
| 3,501,251 A * | 3/1970 | Hedberg et al. | ........... | 416/157 R |
| 3,720,060 A * | 3/1973 | Davies et al. | ............. | 416/157 A |
| 6,113,351 A * | 9/2000 | McCallum et al. | ........... | 416/164 |
| 2007/0116572 A1 * | 5/2007 | Barbu et al. | ............... | 416/132 B |
| 2008/0008587 A1 * | 1/2008 | Siegel | ............................. | 416/31 |
| 2008/0247872 A1 * | 10/2008 | Akcasu | ............................ | 416/41 |
| 2009/0280012 A1 * | 11/2009 | Caffrey | ......................... | 416/147 |

* cited by examiner

*Primary Examiner* — Christopher Verdier
(74) *Attorney, Agent, or Firm* — Fred K. Carr

(57) ABSTRACT

A rotor blade is used in combination with a submersible electrical generator for generating electricity to be put into the grid, where the pitch of the rotor blade is controlled by a microprocessor. The microprocessor controls a radio frequency transmitter which emits signals to a receiver which controls a hydraulic value. The hydraulic valve controls a push-pull arrangement which through a right angle gear and pitch adjustment axial adjust the rotor pitch according to pre-programmed conditions stored in the microprocessor.

7 Claims, 7 Drawing Sheets

MICROPROCESSOR SYSTEM FOR CONTROLLING ROTOR PITCH

RELATED APPLICATIONS

This is a Continuation Application of U.S. application Ser. No. 12/655,358 filed Dec. 30, 2009, Publication No. US 2010/0187825, now abandoned.

BACKGROUND OF THE INVENTION

1. Field of the Invention

The present invention relates to the generation of electrical power from submerged generators using water currents to turn the rotors of the generators, and in particular, the use of a microprocessor to set and maintain rotor pitch.

2. Description of the Prior Art

The United States, with coast lines on both sides and a network of inland rivers and lakes, has significant amounts of ocean wave and tidal power energy resources. These resources are renewable and emission free for energy production. With proper system design and deployment, ocean wave and tidal power could become one of the most environmentally friendly methods for generating electricity yet developed. The Electrical Power Research Institute (EPRI) has projected that as much as 10% of the national energy demand (400 trillion watts per year) could be harnessed from US wave and tidal current energy resources.

Waves are created by winds blowing over large bodies of water; tidal changes in the sea are generated by solar and lunar gravitational forces. As the earth rotates, the elliptical envelope shape of the ocean floor causes the water level to rise and fall. Ocean waves and tides contain tremendous amounts of kinetic energy which could be harnessed to turn generators for the production of electricity. Water is several hundred times denser than air, therefore, has more kinetic energy per unit speed. This enormous power, if harnessed to generate electricity, is fuel cost-free, non-polluting, and self-sustaining. Furthermore, tidal currents are predictable for the indefinite future; wave patterns are predictable for days in advance. Predictability is an important characteristic for an energy source used in electrical generation which is inputted into an electric grid where the supply equals demand.

The present disclosure is concerned with harnessing the kinetic energy in tidal currents which are generated by lunar and solar gravitational forces as the Earth rotates eastward. The tidal currents are to be distinguished from the powerful currents occurring in the Gulf Stream which are caused by winds, uneven temperatures, and the shape of existing land masses. Tidal currents are the periodic motion of water caused by the different lunar and solar gravitational attractive forces on different parts of the eastward rotating Earth. As these gravitational forces change, tides rise and fall causing periodic horizontal movement of water, the tidal currents. The tidal current speed varies from place to place depending on the shape of the coastline being strongest in inlets, sounds, coastal waterways, and related. Since the amount of electricity generated depends on the speed and steadiness of the water driving the generating device, the tidal currents can produce electricity only between high tides and low tides.

For the above reasons, the "capacity factor" for the tidal currents is somewhat less than, for example, powerful ocean currents as in the Gulf Stream which are constant at 4-7 MPH 24 hours per day. The EPRI has estimated that with tidal units and wind units the average power is typically between 30-40% of the "rated power" which is based on a capacity factor of 24 hours per day of continuous year long operation. While the extraction rate is somewhat low, it is well worth the effort since the energy is self sustaining, non-polluting and fuel cost-free.

Tidal kinetic energy extraction is an extremely complex operation and several devices have been proposed. Prior art most often discusses the design of these devices in terms of their physical arrangement. Water and wind turbines are generally grouped into two types: vertical-axis devices in which the axis of rotation is vertical to the ground and perpendicular to the energy stream, and horizontal-axis devices in which the axis of rotation is horizontal to the ground and parallel to the energy stream.

Generators are well known in the prior art, and similar in design and function when used in hydro-electric, wind, or ocean currents. Several models are available commercially, usable in either wind or water, provided the water unit has a water-proof housing. The kinetic energy of the water turns the rotor blades which are attached to a rotor shaft which extends into the generator. A series of step-up gears increase the rotational speed such that electricity is generated.

The rotor blades used on wind turbines tend to be long and narrow, the reason for this design is that the rotors are easier to tie down and secure during violent wind storms, not that they are more efficient in capturing kinetic energy. Since the wind turbines were developed first, it was natural that the long and narrow blades be tried in water turbine systems. However this design has encountered several problems including injury to fish and other marine species, and the blades are often structurally damaged by sea weeds and other submerged debris in the water.

Prior art turbines tested to date destroyed fish and other marine species to the extent that the devices have been nicknamed "chum machines". The long, sweeping motion of the rotor blades tend to attract fish and injure them as they swim by in the sweep path of the rotor blades. In addition, these blades generate a lot of bubbles in the water. This is caused by cavitation, which is caused by difference in pressure gradients which forms vapor bubbles on the blade surfaces. While not lethal to fish, they are unsightly and may have some environmental impact. A recent prototype test demonstrated the structural problem when weeds, debris, and other submerged material caused the rotor blades to break.

Prior art publications can be divided into documents disclosing blades with elliptical shapes, and documents disclosing designs with blade pitch locking mechanism. Prior art disclosing elliptical shapes include U.S. Pat. No. 6,302,652, Roberts inventor, and US2008/01138206, Corren inventor. Prior art for pitch locking mechanisms include U.S. Pat. No. 5,997,253, Feeham inventor, and U.S. Pat. No. 5,611,665, Angel inventor, and U.S. Pat. No. 4,692,097, Biboliet inventor. The above references fail to at least teach or suggest the design of the presently disclosed and claimed invention.

BRIEF SUMMARY OF THE INVENTION

In summary, the rotor blade system disclosed and claimed in U.S. Pat. No. 7,736,127 can be defined as a rotor blade having a base of Width BW, a leading edge, a tip, a trailing edge, where the leading edge begins at the front end of the base and extends upward to the tip, the trailing edge begins at the tip and extends to the back end of the base. The leading edge and the trailing edge are further defined as having elliptically curved edges formed by a radius of eight times the base Width, 8(BW), whereby a straight line drawn from the front of the rotor base to the rotor tip forms a forty five degree angle with respect to the rotor base, and thus the axis of rotation. The rotor blade is functionally connected to a rotor shaft which serves as the axis of rotation through a hub, where one end of the rotor shaft extends into a generator and the other end has a perpendicular pivotal support axial extending through a channel in the hub up to the center of the rotor blade providing a pivotal axial for setting the pitch of the rotor blade relative to the hub. The pitch can be preset and maintained for operation through a locking pin mechanism. The system is submerged with the axis of rotation parallel to flowing water such that the kinetic energy in the water turns the rotor blade converting the kinetic energy to rotation mechanical energy which is transferred through the rotor shaft to a generator for generating electricity which is transferred to an electric grid for use.

The elliptically curved design of the disclosed blade was derived to address two major problems encountered with prior art designs: fish kill and other marine species injury, and the retention of seaweed and other debris on the rotor which causes damage. First the fish kill. The wider the rotor sweep path, that is the diameter from rotor tip to rotor tip, the greater the potential for fish kill and other marine species injury. The elliptically curved design of the present blade decreases the rotor sweep path by twenty five percent since the blade is set at a forty five degree angle relative to straight edge blades, that is, its sweep path diameter is twenty five percent less. In addition, the elliptically curved design set at forty five degrees in the rotor path tends to push the fish aside rather than fatally injury them.

From the discussion in the previous section, it was seen that the rotor blade system disclosed in disclosure U.S. Pat. No. 7,735,127 includes a pivotal support axial perpendicularly attached to a rotor shaft which allows the pitch of the rotor blade to be adjusted by pivoting the rotor blade around the pivotal support axial. The system further includes a securing ring perpendicularly attached to the pivotal support axial for securing the rotor blade to the rotor shaft. With the U.S. Pat. No. 7,735,127 disclosure the pitch has to be manually set and held at the pre-set position by a securing lock mechanism, which also has to be manually set.

In the present disclosure, a microprocessor control center (MPCC) controls the pitch through a pitch adjustment device located inside the rotor shaft. A remote control device controls the pitch adjustment device, which in the illustrative embodiment, is a radio frequency (RF) hydraulic control system for controlling the pitch adjustment device. A microprocessor MP is interfaced to a RF transmitter which emits a RF signal to a RF receiver which is part of the pitch adjustment device located in the rotor shaft. This eliminates the need for an electrical cable or hydraulic hose connection. The RF receiver controls the hydraulic function of a hydraulic valve which is associated with a push/pull arrangement which through a right angle gearbox causes the rotors to pivot around a perpendicular pivotal support axial thereby setting the pitch. Pitch adjustment is controlled by a MP in accordance with the tide charts for obtaining a more even power input into the grid.

The turning of the rotor by the flowing water removes the kinetic energy from the water. There has been some speculation that removing the kinetic energy of the currents may have local environmental effects, although this has not been established. The presently disclosed design has a MP controlled variable pitch feature which provides a great tool for evaluating this. The greater the pitch, the more kinetic energy removed.

Accordingly, the primary objective of this invention is to provide a turbine rotor blade for use with a submerged generator placed roughly parallel in flowing water where the kinetic energy in the flowing water causes the rotor to turn which spins the generator generating electricity.

A further objective of the invention is to provide a variable pitch rotor blade whereby the angle of pitch of the rotor blade in relation to the flowing water is adjusted and maintained which determines the amount of kinetic energy removed from the flowing water.

A further objective of the invention is to provide a rotor blade whereby pitch is controlled by a MP through a pitch adjustment device which pivots the rotors.

A further objective of the invention is to provide a rotor system where the direction of the rotors are reversed during slack tide by a MP.

A further objective of the invention is to provide a rotor whereby pitch is controlled by a programmed MP according to tidal cycles.

BRIEF DESCRIPTION OF THE DRAWINGS

Other features of the present invention will become more evident from a consideration of the following patent drawings, which form a part of this specification.

DETAILED DESCRIPTION OF THE INVENTION

Figure 1:
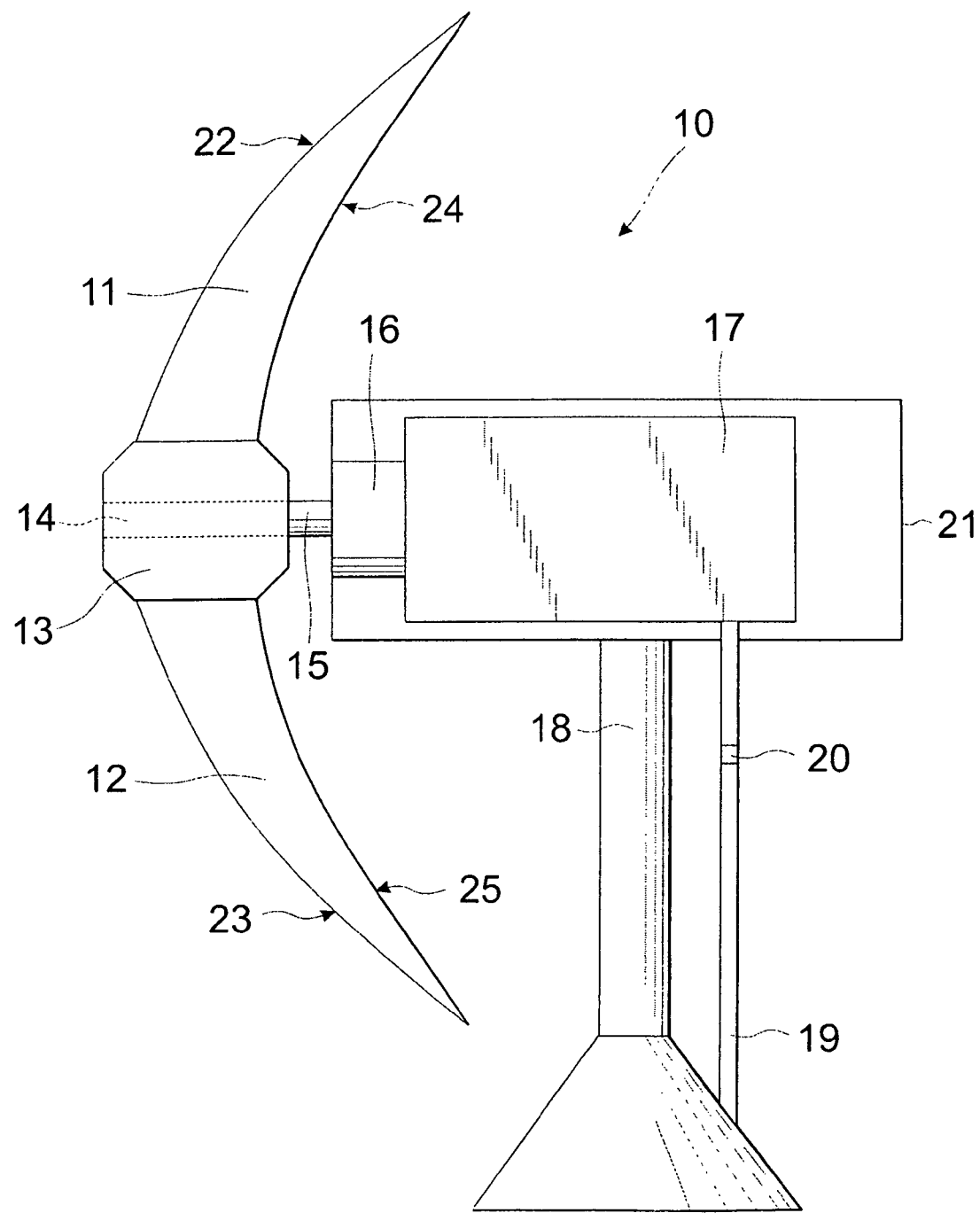
FIG. 1 is a schematic side view of a prior art submersible electrical generating system as disclosed in U.S. Pat. No. 7,736,127.

First there is an overview of the electrical generating system disclosed and claimed in U.S. Pat. No. 7,736,127. Referring now to FIG. 1, there is shown a schematic side view of a submersible electrical power generating system as disclosed and claimed, generally designated 10. An important feature of the disclosure is the structural design of the rotor blade. The improved rotor blade design has elliptically curved edges rather than the straight edge design of prior art rotor blades, and the blade forms a forty five degree angle with respect to the axis of rotation. The structural design having elliptically curved edges lessens fish injury and allows debris to slide along the edges and off into the currents. Also, the design significantly decreases the sweep path by twenty five percent.

The electrical power generating system 10 has two balanced rotor blades 11,12. The system could have other multiples of rotor blades; two are shown in the example. The blades 11,12 are functionally connected to the hub 13 which has at its exact center the axis of rotation 14. A rotor shaft 15 transfers the rotational mechanical energy to a generator 17. One end of the rotor shaft 15 forms the axis of rotation 14 and the other end extends into the step-up gear box 16 transferring the rotational mechanical energy to the generator 17.

Rotor blade 11 has a leading edge 22 and a trailing edge 24; rotor blade 12 has a leading edge 23 and a trailing edge 25. The kinetic energy of the moving water turns the rotor blades 11,12 thereby converting the kinetic energy into rotational mechanical energy which is transferred to the step-up gears 16 through the rotor shaft 15. The step-up gears increase the rotational speed through a series of gears. Step-up gear boxes typically contain planetary and helical gears for converting low speed to a higher speed which drives a high speed shaft to generate electricity, which constitutes a step-up gear means. Turbine step-up gears are widely used today, for example, in wind turbines and are commercially available. The increased rotational speed turns the generator 17. Generators are also well known in the art and are used in hydro-electric and wind turbines. Several models are commercially available, General Electric being one of the larger manufacturers of generators. Water generators have water tight housing 21 forming a water tight nacelle. The generator 17, step-up gears 16, and water tight housing 21 constitute a generator means.

Support frame 18 positions and holds in place the generating system 10 in the flowing water. In one embodiment the support frame is mounted to a frame support foundation (not shown) in the water. However, the support frame 18 may be attached many ways known to one skilled in the art including existing structures as bridges and docks as well as to floating structures as ships and barges. The support frame 18 is essentially a support member attached at one end to the generator housing 21 and at other end to a solid structure, bridge, or floating device. When taken together, these constitute a support means.

There is an electrical wire 19 connecting the generator 17 to an electrical grid (not shown) to which the electricity is transferred for use. Electrical connector 20 in electrical wire 19 allows one to disconnect or disable the generator 17 from the grid. The electrical wire 19 and connector 20 could be placed within the support frame 18 for protection.

Figure 2:
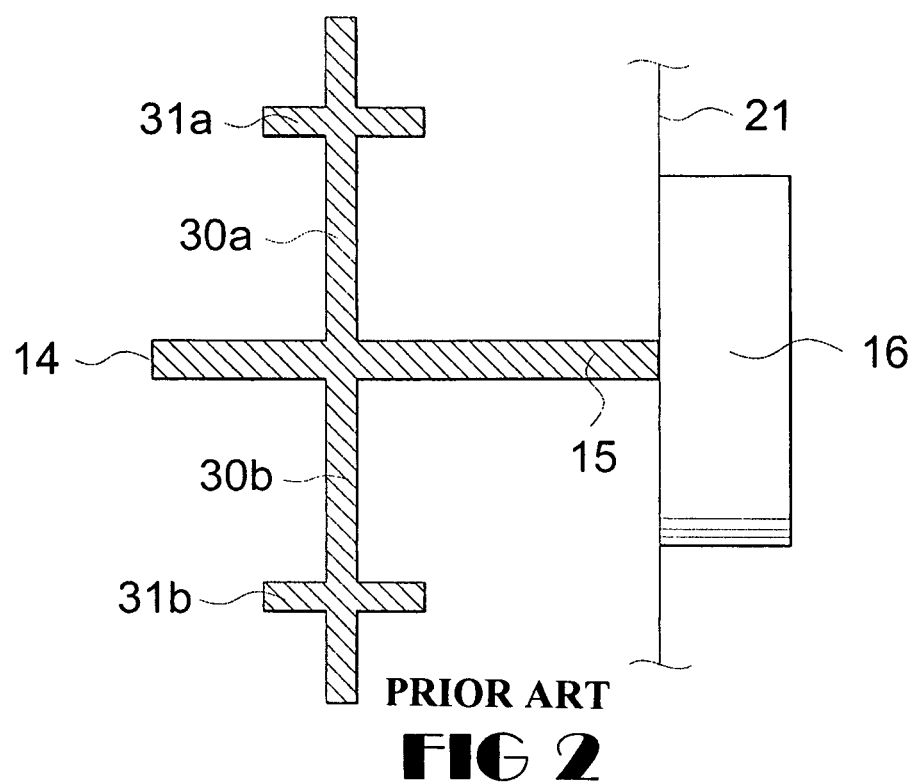
FIG. 2 is a schematic cross-sectional side view of the rotor shaft with perpendicular pivotal support axial as disclosed in U.S. Pat. No. 7,736,127.

Referring now to FIG. 2, there is shown a schematic cross-sectional side view of the rotor shaft 15 with attached perpendicular pivotal support axials 30a,30b of the U.S. Pat. No. 361,179 disclosure. These extend through a hub into a channel in the base of the rotor blade such that the pivotal support axials 30a,30b functionally connect the base of the rotor blade to the rotor shaft 15 in a manner such that the blade can pivot around the shaft. The rotor shaft 15 is positioned at the axis of rotation 14, and extends into a step-up gear box 16 through a water tight seal in the housing 21 which forms a water tight nacelle around the step-up gears and generator, not shown. The other end of the rotor shaft 15 is external to the housing 21, and has attached the upper perpendicular pivotal axial 31a and a lower perpendicular pivotal axial 31b. The pivotal axials 15a,15b extend through the hub into channels in the lower portion of the rotor blade pivotally connecting rotor blades 11,12 to the rotor shaft 15.

There is further shown securing rings 31a and 31b perpendicularly attached to the pivotal support axial 30a,30b, respectfully. The securing rings 31a,31b secure the rotor blades to the rotor shaft 15 in a manner that the rotor blades can be pivoted around the pivotal support axial 30a,30b. The securing ring 31a is a circular ring fitting in a channel in the rotor. In the illustration, there is shown one securing ring per pivotal support axial, in practice, there could be a plurality of securing rings for additional support.

The rotor blades 11,12 could be permanently attached to the perpendicular pivotal axial 30a,30b, respectively, as may be desirable in deep steady currents, or there can be a pivotal connection as discussed above for the preferred embodiment. The rotor shaft 15 is positioned at the axis of rotation 14, and transfers the rotation mechanical energy to the step-up gears 16. In the example, there are two rotor blades functionally connected to the rotor shaft 15. If three or more rotor blades were used, there would be three or more perpendicular pivotal support axial equally spaced around the rotor shaft.

Figure 3:
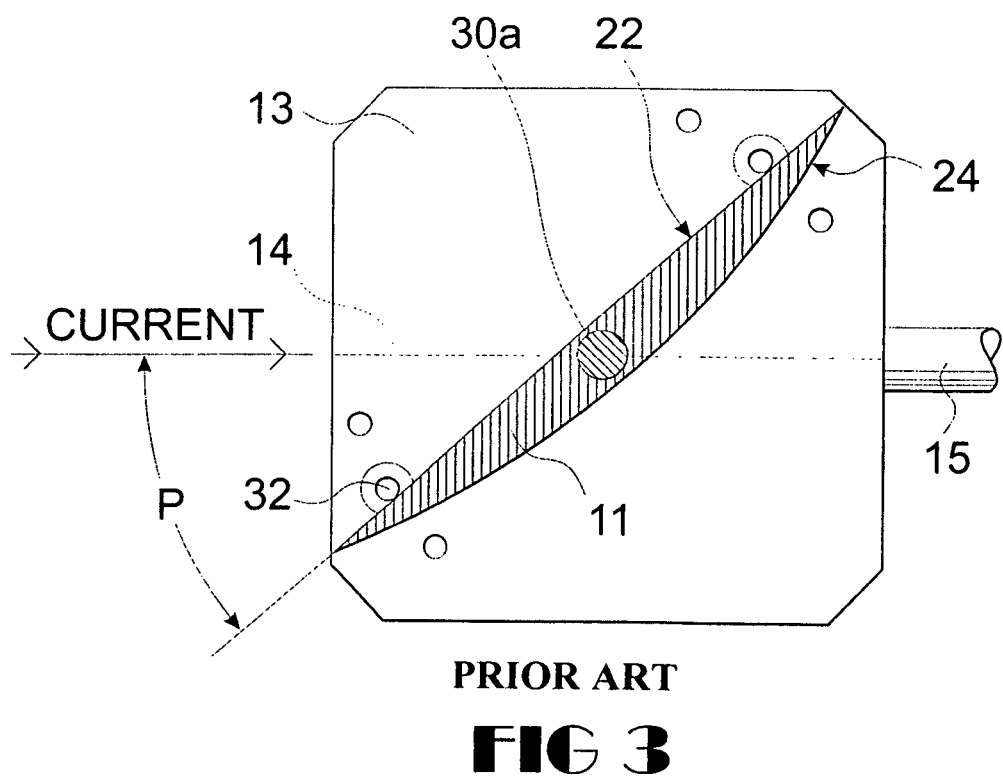
FIG. 3 is a top view of the rotor blade on the hub where the rotor blade and perpendicular pivotal support axial as shown as cross-sectional as disclosed in U.S. Pat. No. 7,736,127.

Referring now to FIG. 3, there is shown a top view of the rotor blade 11 functionally connected to rotor shaft 15, where the rotor blade 11 and the perpendicular support axial 30a are shown as cross-sectional, positioned on top of hub 13, as disclosed in disclosure U.S. Pat. No. 361,179. The pivotal support axial 30a is attached to rotor shaft 15 which transfers the rotational mechanical energy to the step-up gear box, not shown. The rotor shaft 50 is at the axis of rotation, represented by broken line 14. Currents flow into the high pressure side 22 causing the rotor to turn, the curved side is the low pressure side 24.

Pitch, designated P, is used in this discussion to describe the angle between the axis of rotation 14 and the high pressure side 22 of the rotor blade. The Pitch P determines the angle at which the water current strikes the rotor blade. Blade pitch P, or simply pitch, refers to the angle of attack of a rotor blade into or out of the kinetic energy source (wind or water) which controls the production or absorption of power; wind and water turbines use this to adjust the rotation speed and thus generated power. Referring further to FIG. 3, it can be seen that the water current is flowing parallel to the rotor shaft 15. Blade pitch P is the angle between center of the rotor shaft 15, designated by the broken line 14, and the high pressure side 22 of the rotor blade 11 shown as a hatched cross-sectional view. In prior art pitch, blade pitch, angle of pitch, and attack angle are used interchangeably. When the high pressure side 22 of rotor blade 11 is exactly parallel to the rotor shaft 15, blade pitch P is zero and the rotor blade 11 would not turn since the angle of attack is also zero. If the rotor blade 11 were rotated ninety degrees, the high pressure side 22 would be perpendicular to the rotor shaft 15. Reversing the blade pitch, rotating from a positive blade pitch to a negative blade pitch, would reverse the direction of the rotor blade 11. In summary, the rotor blade means 11 has a blade direction which is set to correspond to the direction of the current, and the rotor blade means 11 has an angular blade pitch as defined above.

The rotor blade 11 can be pivotally rotated around the pivotal support axial 30a in a manner to adjust the angle of Pitch, P. Once the P has been adjusted to the desired setting, the rotor blade is held in position by locking pins 32. Locking pins 32 are semi-circular fasteners attached to the high pressure side of the rotor blade. The top of the hub 13 has a plurality of holes. Once the P has been set, pins are inserted through holes in the locking pin fastener into the corresponding hole in the top of the hub thereby securing the angle of the blade relative to the hub, thus the P, where P is defined as the angle between the axis of rotation and the high pressure side of the rotor blade. The semi-circular fasteners, the pins, and the plurality of holes in the hub constitute a locking pin means.

The turning of the rotor blade extracts kinetic energy from the flowing water transforming the energy to rotational mechanical energy which is used to generate electricity. There has been some concern expressed that removing too much of the kinetic energy could have negative environmental effects locally. Adjusting the P in the present design allows one to adjust the amount of kinetic energy removed; a lesser P would extract less energy and a greater P would extract more energy. The P is generally set somewhere between thirty and sixty degrees during operation.

Tidal currents flow inward during high tides and outward during low tides twice per day. To harvest the kinetic energy during the bi-directional flow cycles, the direction of the generator would either have to be reversed, or the angle of the rotor blades would have to be reversed for out-flow. The pivotal support axial designs allows for changing the direction of the rotor such as to be effective in bi-directional currents. Tide tables, commonly called tidal charts, are tidal predictions which show the daily times and heights of high water and low water for a particular location. The National Ocean Service collects and distributes tidal data and predictions for water levels and current speeds in the US. This data is used by mariners and ship operators to navigate vessels; tide tables (tidal charts) include predictions of daily magnitude and timing of high and low water, maximum flood, maximum ebb, and slack tide for a number of reference stations throughout the US. Slack water, or slack tide, is a short period of time in a body of tidal water on either side of high water or low water when there is essentially no movement either way in the tidal stream; these occur just before the direction of the tidal stream reverses. Tidal current predictions (tidal charts) are widely available in print and digital format, and are used in the present application to control rotor direction and pitch.

As discussed above, the electrical generating system disclosed and claimed in disclosure U.S. Pat. No. 7,736,127 includes a pivotal support axial 30a perpendicularly attached to a rotor shaft 15 which allows the pitch of the rotor blade to be adjusted by pivoting the rotor blade around the pivotal support axial. The system further includes a securing ring 31a perpendicularly attached to the pivotal support axial 30a for securing the rotor blade to the rotor shaft 32. The pitch is manually set and thereafter held in place by a securing lock mechanism. The present invention uses a MPCC to control pitch as discussed below.

Tides are the rise and fall of sea levels caused by the rotation and gravitational forces exerted from the moon and sun. Tidal cycles occur every 12.5 hours and are influenced by the shore bottom. Most coastal towns experience two high tides and two low tides each day, although the magnitude of the two are not equal. While tides are the largest source of coastal water fluctuations, sea levels are also subject to forces such as wind and barometric pressure resulting in storm surges. The times of high tide and low tide can be predicted years in advance forming tidal charts.

Tides produce oscillating currents known as tidal streams. The moment at which the tidal currents cease is called "slack tide". The tides influence on local current flow is more difficult to analyze and predict. A tidal height is a measurement over a wide area, current flow is influenced by both magnitude and direction as well as shore line.

The amount of power extractable from a current is determined by the timing and tidal current magnitude. While turbines are able to extract energy most of the tidal cycle, in practice there are intervals during which generators lose efficiency due to low operating rates. Since the power available from a given flow is proportional to the cube of the flow speed, there is a short interval time when highest power generation potential exist. From slack time to high tide there is an increasing current flow. Once high tide has been reached, there is a decrease in current flow back to slack tide. Therefore the tidal cycle is such that it goes from no current generation to increasing generation to peak and back to decreasing generation. This cycle causes surges in the input of energy into the grid, which is not a desirable situation. In addition, the direction of the generator would have to be reversed twice per day to harness incoming tides and outgoing tides during slack tide, or as in the present invention, the direction of the rotors are reversed.

Tidal charts are predictable for years in advance, and are available from several sources including the National Ocean Service which distributes data and predictions for tidal current direction, speed, and levels. These constitute a tidal current database means. An objective of the present invention is to use a microprocessor process to control pitch of the rotors during tidal cycles to level out power production. As an example, data would be down-loaded to the MPCC of slack tide times for a period of time in the future; the direction of the rotors would be reversed at these programmed times. Data of predetermined pitch during tidal cycles could be down-loaded, having greatest pitch just after slack tide, decreasing to high tide, and then increasing pitch back to slack tide. Also, there could be a down-load to set pitch a zero throughout the cycle during storm surges to prevent structural damage.

Different turbine designs have varying efficiencies and therefore varying power output. If the efficiency "Cp" of a turbine is known the following equation can be used to determine the power output: $P=Cp \times 0.5 \times d \times A \times V^3$, where $Cp$=the turbine coefficient, $P$=the Power generated (watts), $d$=the density of seawater (1025 kg/m), $A$=the sweep area of the rotor ($m^3$), $V^3$=the velocity of the flow cubed. An objective of the present invention is to increase turbine efficiency.

Figure 4:
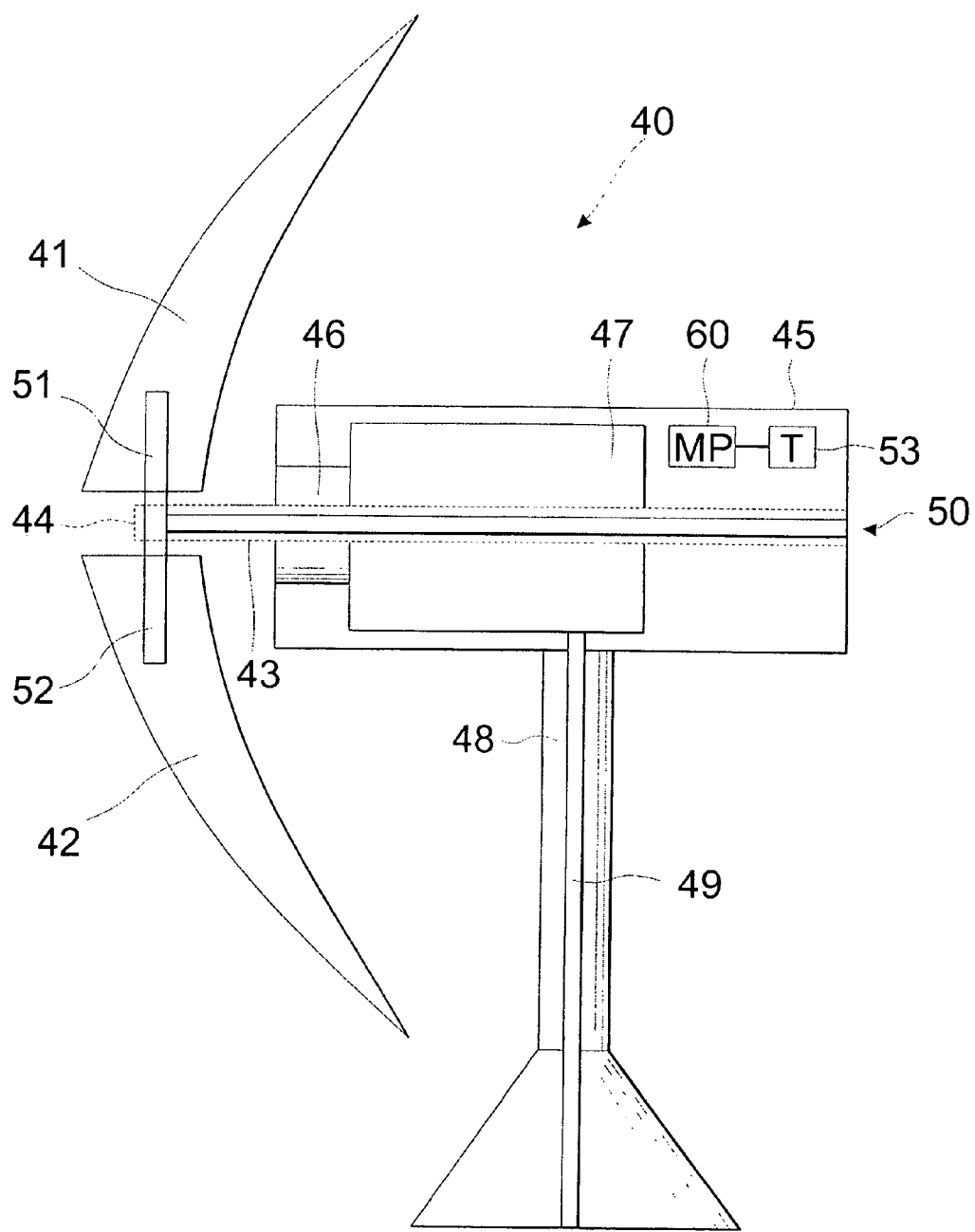
FIG. 4 is a schematic side view of the present submersible electrical generating system showing various components.

In the present disclosure, a microprocessor controls the pitch. Referring now to FIG. 4, there is shown a submersible generating system, generally designated 40. Two rotor blades 41,42 are functionally connected to rotor shaft 43 having an axis of rotation 44, through perpendicular pivotal support axial 51,52. The rotors 41,42 are functionally connected to one end of rotor shaft 43, and the other end of rotor shaft 43 extends through water tight housing 45 to step-up gear 46 further extending through generator 47 to back of housing 45. Support base 48 maintains the electrical generating system 40 in position in the flowing water. Electrical connection 49 connects the generator 47 to the electrical grid, not shown. There would be in addition an electrical connection for a modem.

The MPCC 60 controls rotor pitch through a remote control device, which in the illustrative example is a radio frequency hydraulic control system. The MPCC 60 is interfaced to a transmitter 45 which emits RF signals to a receiver which is part of the pitch adjustment device 50, located in the rotor shaft 43. A pitch adjustment device 50 adjusts and maintains the pitch of rotors 41,42. The pitch adjustment device 50 connects to the rotors 41,42 through a radio frequency hydraulic control system, and includes a RF receiver, a hydraulic valve, a push/pull arrangement, a right angle gear adopted for push/pull movement, and a pitch adjustment axial, discussed below. During operation, the pitch adjustment device 50 causes the above stated components to turn the rotors 41,42 where one rotor turns clockwise and the other rotor turns counter clockwise.

Figure 5:
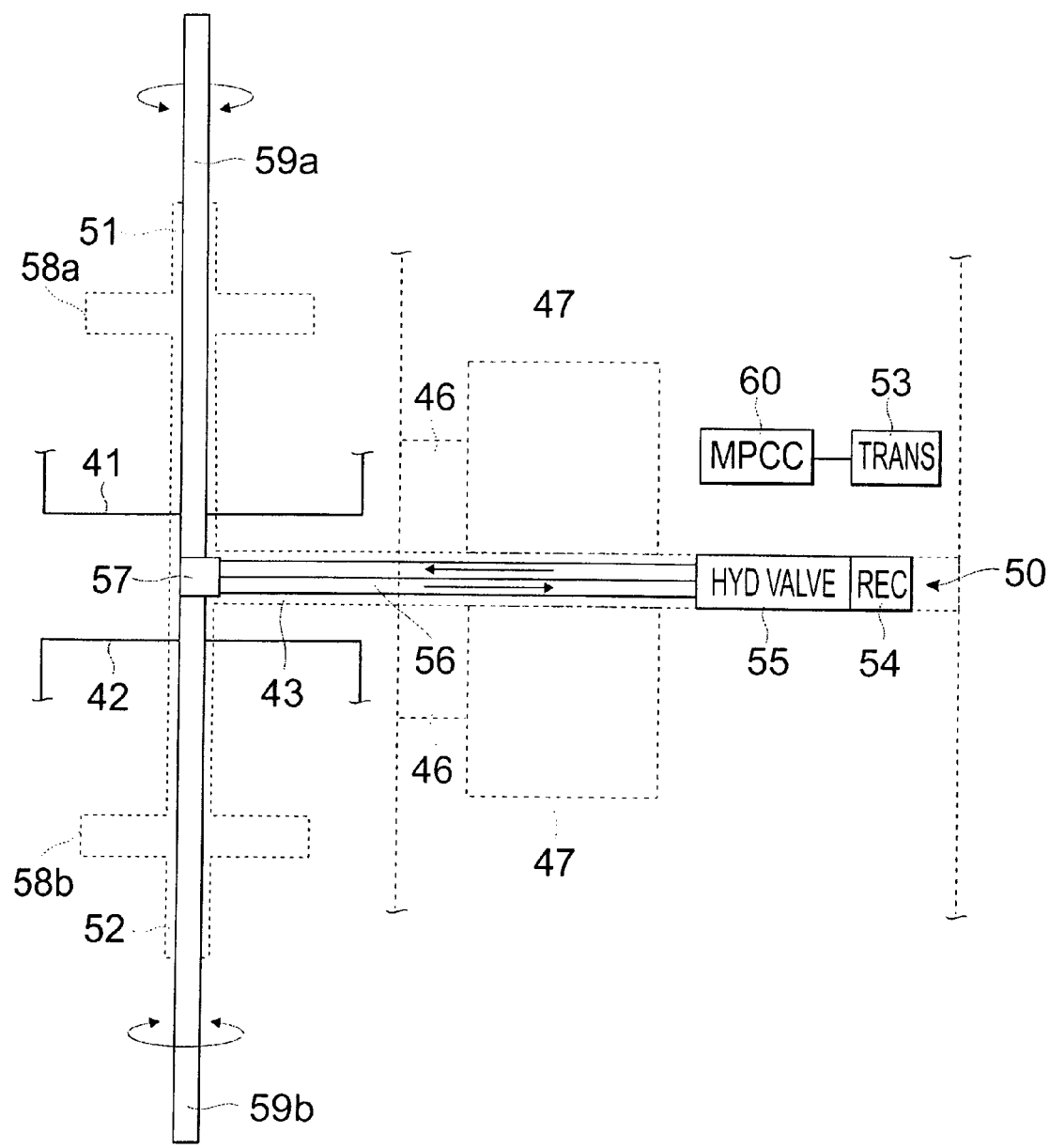
FIG. 5 is an enlarged cross-sectional side view of the microprocessor control center and its remote control of the pitch adjustment device in the rotor shaft for adjusting pitch.

Referring now to FIG. 5, there is shown an enlarged schematic diagram demonstrating the mechanism for controlling rotor pitch. In general, the MPCC 60 controls the pitch control device 50, located inside the rotor shaft 43. The pitch control device 50 turns with the rotor shaft 43, accordingly, there needs to be a connection between the two which does not utilize hydraulic hose or electrical cables. The illustrative embodiment of the present invention utilizes a radio frequency hydraulic control system to control the pitch of the rotors 41,42 by hydraulic function. Radio frequency hydraulic control systems are commercially available, for example, Cascade Corporation in Canada. The remote control system uses a transmitter 53 to send a RF signal to a receiver 54, which is part of the pitch adjustment device 50 located in the rotor shaft 43. Receiver 54 controls hydraulic function through hydraulic valve 55. Hydraulic valve 55 is connected to a push/pull arrangement 56 which controls the pitch of rotors 41,42 through a right angle gearbox 57. The push/pull arrangement 56 causes one rotor to turn counter clockwise and the other rotor to turn clockwise. Gear 57 is a right angle gearbox designed for push and pull movements. It is a bevel gear with through-going, not rotating spindle, adopted for push and pull movements, commercially available from Ketterer. A RF transmitter 53, a RF receiver 54, a hydraulic valve 55, a push/pull arrangement 56, a right angle gear 57 adopted for push-pull movement, and a pitch adjustment axial 59a constitute a pitch adjustment means.

As with the 127 disclosure, the rotors of the present system rotate around a perpendicular pivotal support axial which is attached to the rotor shaft. Securing rings secure the rotor blades to the rotor shaft in a manner that the rotor blades can be pivoted around the pivotal support axial. Referring further to FIG. 5, the pivotal support axials are represented by broken lines and designated 51,52 for rotors 41,42, respectfully. With the present system, there are in addition pitch adjustment axials 59a,59b inside the pivotal support axial 51,52. The rotors pivot around the pivotal support axials 51,52, the pitch adjustment axial 59a,59b cause the rotors to pivot. These are permanently attached to the rotor at one end, and the other end extends into right angle gearbox 57. Securing rings 58a,58b secure the rotors 41,42 to the pivotal support axials 51,52.

The MPCC 60 is interfaced to a RF transmitter 53 through a receiver interface, shown below. During operation, the MPCC 60 causes a RF transmitter 53 to emit a RF which is received by a RF receiver 54. The receiver 54 controls hydraulic function of a hydraulic valve 55. The hydraulic valve 55 controls the push/pull arrangement 56 which is functionally connected to the rotors 41,42 through right angle gear 57, right angle gear 57 functionally connects push/pull arrangement 56 to rotors 41,42. The push/pull arrangement 56 causes one rotor to turn counter clockwise and the other rotor to turn counter clockwise.

In the illustrative embodiment discussed above a radio frequency hydraulic control system is used as the remote controller of the pitch adjustment device located in the rotor shaft. This eliminates the need for electrical cables and hydraulic hoses between the two. However, the pitch adjustment device could be controlled remotely by other ways known to those skilled in the art including the use of infrared signals rather than RF signals between the transmitter and receiver, and the use of a stepper motor rather than hydraulic control to change pitch, and other combinations thereof.

In disclosure U.S. Pat. No. 7,736,127 there was disclosed and claimed a rotor blade defined as a blade having a rotor base with Width W, a leading edge, a tip, and a trailing edge. The leading edge begins at the front of the base and continues to the rotor tip, and the trailing edge begins at the rear of base and continues to the rotor tip. The leading ledge and the trailing edge are further defined as elliptical curves which have a radius of eight times the base width. A straight line drawn from the front of base to tip has a linear distance of (4.0)W and forms a forty five degree angle with respect to the rotor base, which is parallel with the axis of rotation. The preceding description constitutes an elliptical curve means. The rotor blade is used to capture the kinetic energy of flowing water which is transferred to a generator as rotational mechanical energy through a rotor shaft. The rotor blade is functionally connected to the rotor shaft through a perpendicular pivotal support axial which allows the pitch of the rotor blade to be adjusted. Securing rings secure the rotor blade to the rotor shaft. The rotor shaft transfers the rotation mechanical energy to a step-up gear box which increases the rotational speed sufficient to generate electricity which is transferred to an electrical grid.

The present illustrative embodiment utilizes a similar rotor design with the addition of a pitch adjustment axial which is located in the pivotal support axial, and is attached to the rotor for causing the rotor to pivot. Referring further to FIG. 5, there is shown a rotor blade 41, a perpendicular pivotal support axial 51, and a securing ring 58a, which constitute a rotor blade means. While the elliptically shaped rotor is used in the illustrative embodiment, the presently disclosed pitch adjustment device 50 could be used to control other rotor designs known to those skilled in the art including straight edge designs, long and slender designs previously discussed, and other combinations thereof.

Figure 6:
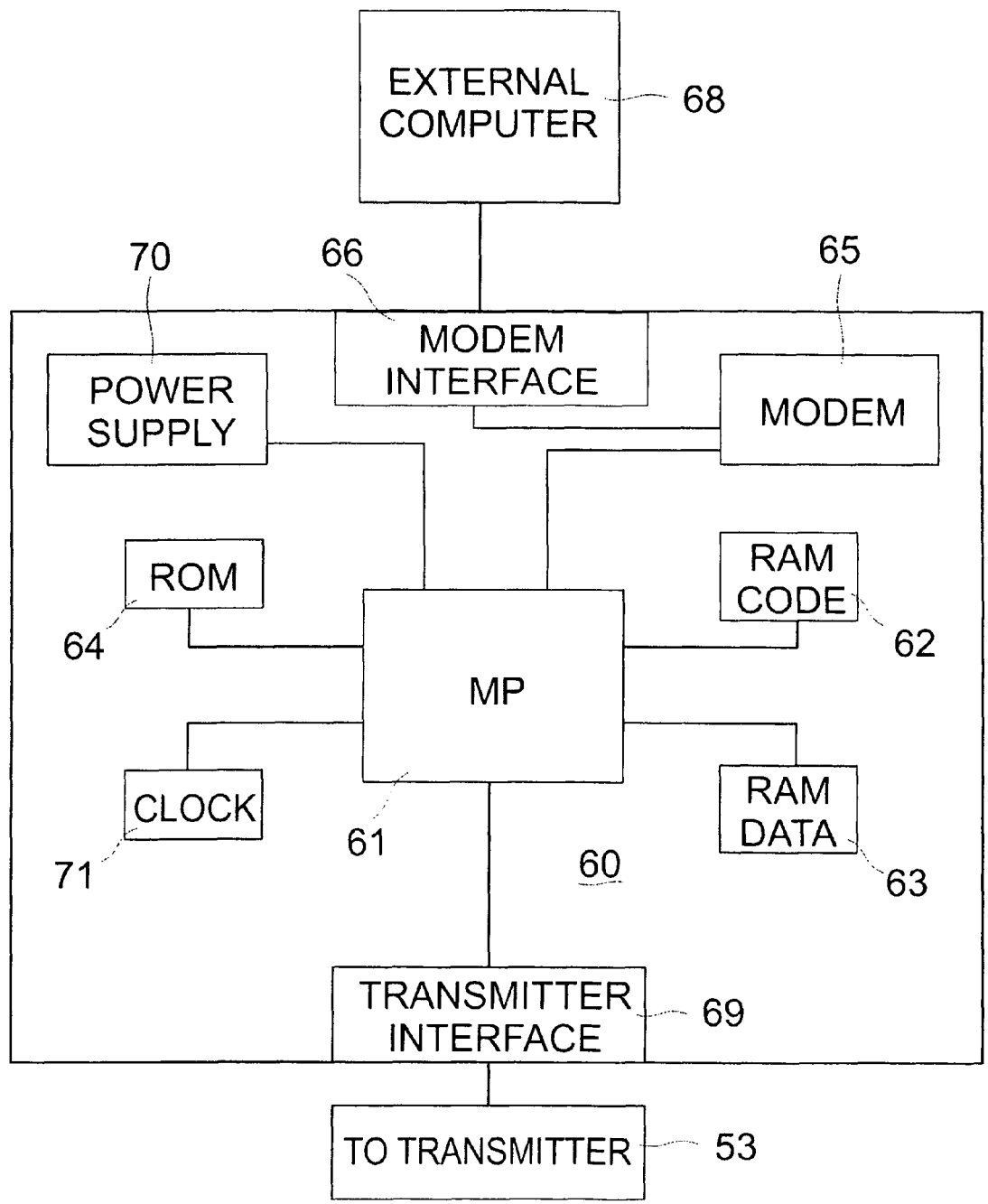
FIG. 6 is a block diagram of the microprocessor control center located in the nacelle of the present invention for controlling rotor pitch.

Referring now to FIG. 6, there is shown a block diagram of the MPCC 60, located in the nacelle of the generating system 40. The primary function of the MPCC 60 is to control the pitch of the rotors 41,42, but it may simultaneously perform other task. The MPCC 60 functions as a control for processing commands to the RF transmitter 53 which controls the pitch adjustment device 50 through RF receiver 54 thereby controlling the pitch of rotors 41,42. The MPCC 60 includes a MP 61, a first nonvolatile RAM CODE 62 means for storing operating code, a second static RAM DATA 63 means for temporarily storing commands and other data. A ROM 64 means stores operating code routines. A baud clock 71 times communication, and a power supply 70 provides power, where the power source may be battery or electrical current as widely used in the computer industry. Modem 65 provides remote communication to an external computer network 68. Interface 69 provides communication to RF receiver 53, and interface 66 provides communication to external computer network 68. The MP 61, RAM CODE 62, RAM DATA 63, ROM 64, Clock 71, Power Supply 70, Modem 65, Modem interface 66 to External Computer 68, and RF Transmitter Interface 69 constitute a MPCC means. Components for the pitch adjustment circuit of the MPCC 60 means are available from various electronic component vendors.

Figure 7:
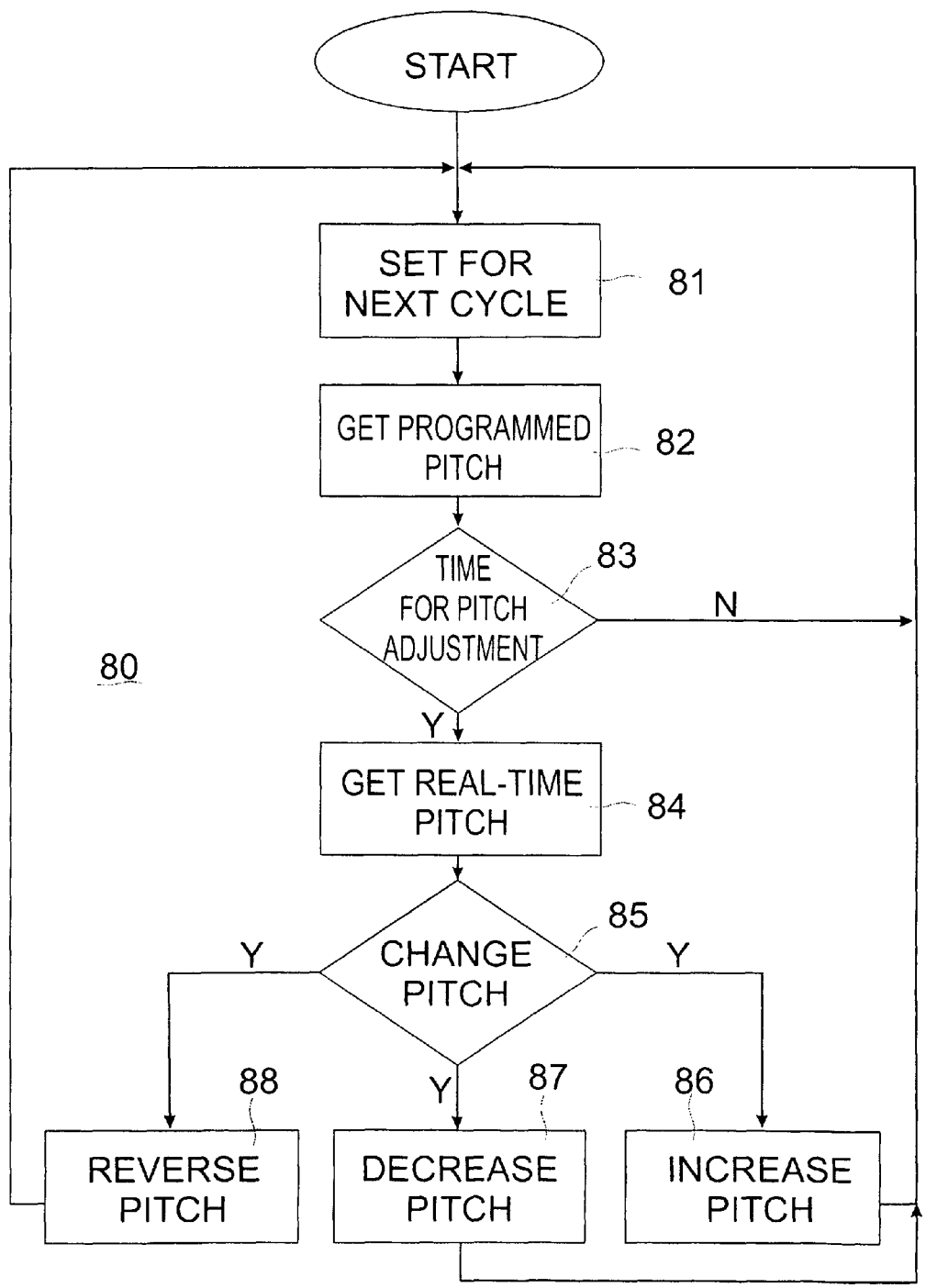
FIG. 7 is a program flow chart for the execution of the command structure of the present invention.

The RAM CODE 62 stores operating code for controlling the RF transmitter 53. Control software and other data can be down-loaded through Modem 65 where the operating code is stored in nonvolatile RAM CODE 62 unchanged until it is updated by a subsequent down-load. A static RAM DATA 63 temporarily stores command and response data to the commands for the MP 61. The system operating routines are stored in ROM 64. The MP 61 includes an input pathway for receiving input signals indicative of the programmed blade direction and the angular rotor pitch (programmed pitch shown in FIG. 7); and an output pathway for sending output signals to reverse pitch (which changes rotor direction), to decrease angular blade pitch, or to increase angular blade pitch. The output signals cause real-time blade pitch to equal the programmed blade pitch according to the tide tables as shown in FIG. 7. Programmed blade pitch refers to a data base of data points which assigns an assigned blade direction and an assigned blade pitch to tidal chart time predictions, and this data base of data points is stored in RAM 63 as a look-up table. As discussed above, tidal charts list tidal predictions of daily times for slack tide and daily times and magnitude of high tide and low tide for thousands of geographic locations. This data base instructs the MPCC to set the rotor direction and rotor pitch at an assigned value throughout the tidal cycle at these locations. The look-up table, referred to as programmed pitch in the disclosure, includes a table of time intervals taken from time predictions in tidal tables where an assigned value indicative of rotor blade direction and rotor blade pitch is assigned to each predicted time interval; these data points are referred to as assigned blade direction and assigned blade pitch; this constitutes a look-up table means.

Referring now to FIG. 7, there is shown a flow chart generally designated 80, demonstrating how commands are processed by the MPCC 60. The commands are stored in RAM CODE 62, and during operation the commands read or clear queues. Operating routines are stored in ROM 66. As shown by block 81, the MP 61 sets the next cycle and thereafter gets the real time. As previously discussed, data relating to tide charts have been previously down-loaded and stored in MPCC 60. The data includes the pre-programmed times for reversing the rotors 41,42 at slack tide, and data for setting the pitch according to tidal charts. In block 82, MP 61 gets the pre-programmed pitch and coordinated times. In decision block 83, the MP 61 determines if it is time for a pitch adjustment. A negative condition in decision block 83 causes an exit from the loop wherein it resets for next cycle. A positive condition in decision block 83 causes the system to get the real, or existing rotor 41,42 pitch shown in block 83. Decision Block 84 compares pre-programmed pitch to real pitch. If it is time to reverse rotor 41,42 position (slack tide), decision block refers to block 88 whereby rotor direction is reversed. If it is determined real pitch needs to be increased in accordance with pre-programmed pitch, decision block 85 refers to block 86 whereby pitch is increased accordingly. If it is determined that pitch needs to be decreased in accordance with pre-programmed pitch, decision block 84 refers to block 87 whereby pitch is decreased accordingly. As previously discussed, pitch adjustment is made by pitch adjustment device 50. After pitch adjustment, blocks 86,87,88 exit from the loop wherein it resets for another cycle.

As previously discussed, blade pitch is defined as the angle between the center of the rotor shaft 15 and the high pressure side of rotor blade 11. The MP 61 controls blade direction and pitch from the discussed look-up table of programmed (assigned) blade direction and pitch which is stored in RAM 63; code in the MPCC 60 instructs MP 61 to change existing blade direction and pitch to equal programmed blade direction and pitch at programmed times. Attention is now directed to terms used in the flow chart shown in FIG. 7, where tidal chart predictions of times and magnitudes of high and low water are assigned valves for rotor direction and pitch. Since tidal currents reverse direction at slack tide, it necessary to reverse blade direction at slack and it would be desirable to adjust blade pitch throughout the tidal cycle to control the production of power. To achieve this, tidal charts in digital format are assigned an assigned blade direction and an assigned blade pitch for future time intervals which is up-loaded to MP 61 and stored in RAM 63 as a look-up table. Block 82 instructs MP 61 to . . . GET PROGRAMMED PITCH . . . where programmed blade pitch is defined by the above look-up table having data points of assigned blade direction and pitch which correspond to tidal chart time predictions. When it is time for a direction and pitch adjustment, Block 84 instructs MP 61 to . . . GET REAL-TIME PITCH. The MP 61 in decision block 85 thereafter changes real-time rotor direction and pitch to equal programmed (assigned) rotor direction and pitch by block 86 . . . INCREASE PITCH . . . , block 87 . . . DECREASE PITCH . . . , or block 88 . . . REVERSE PITCH . . . , moving from positive to negative which would reverse rotor direction.

Figure 8:
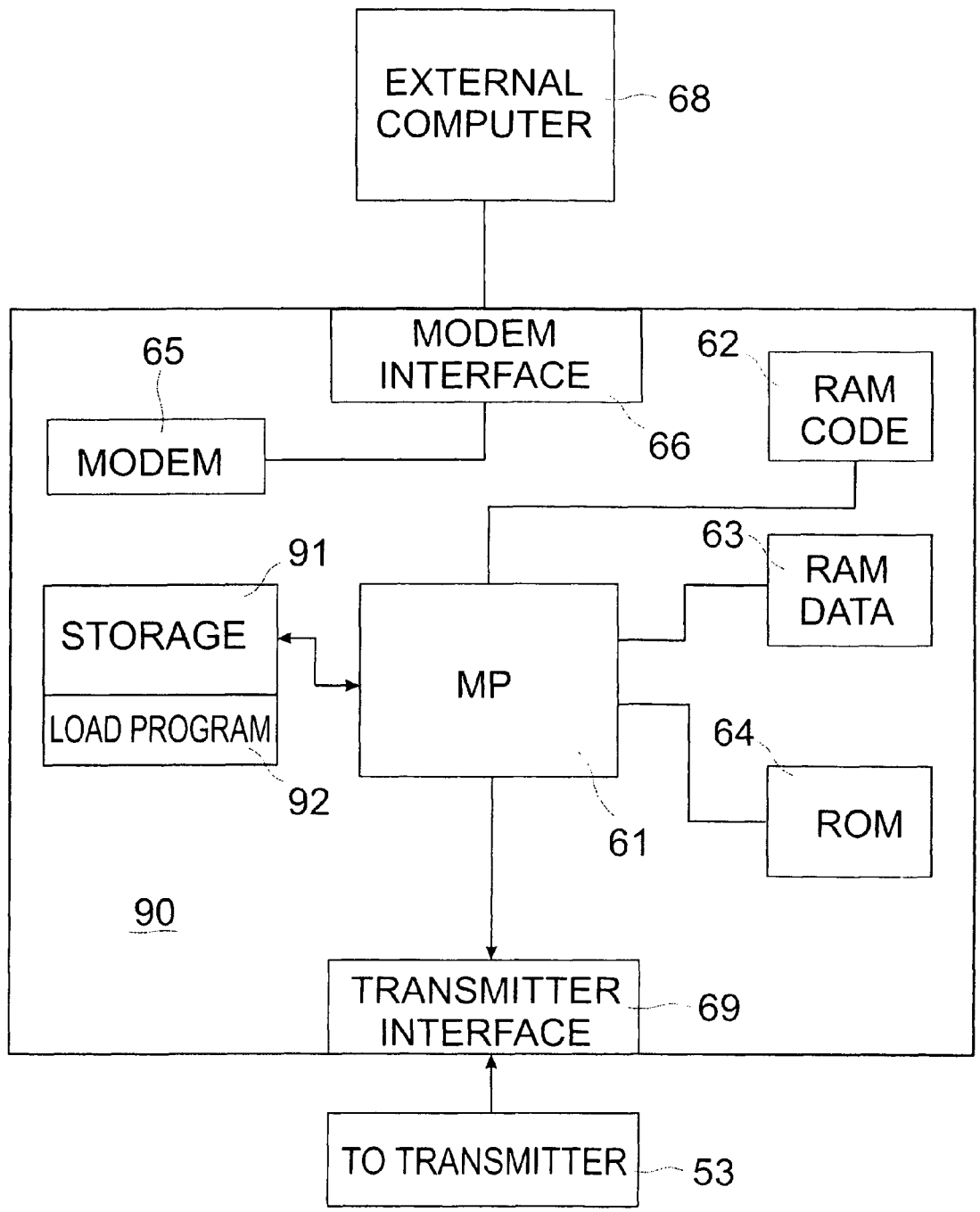
FIG. 8 is a block diagram of the present invention connected to an external computer for down-loading code and data.

The present invention allows for updates of the operating code for MPCC 60 as well as other date utilized by the system as rotor reversal times and tide chart-rotor pitch data. The data is down-loaded from an external computer 68 through a modem interface 66. Referring now to FIG. 8, there is shown a block diagram, generally designated 90, for the down-load procedure. There is shown a storage device 91 associated with a load program 92. The storage device 91 receives data from the modem interface 66 for temporary storage, after which the load program 92 transfers the data at command. During a down-load, the code or other data is typically transferred from the hard drive of the external computer 68 through the modem interface 66 to the storage device 91 for temporary storage. On command, the data is transferred by MP 61 to nonvolatile RAM CODE 62 where the down-load is executed by the load program 92. The old code is removed and replaced by the new code. The Modem Interface 66, the Modem 65, Storage 91, and Load Program 92 constitute a down-load communication means.

Referring again to FIG. 4, there is shown a generator system 40 with two rotors 41,42 functionally connected to a rotor shaft 43 with a pitch adjustment device 50 located within, where the rotor shaft 43 and pitch adjustment device 50 extend form front of housing 45 to rear of housing 45. In the illustrative embodiment, the rotors 41,42 are shown in plain with the drawing page. In an alternate embodiment, two additional rotors, not shown, would be functionally connected to the rear of the rotor shaft 43 and pitch adjustment device 50 for a total of four rotors per generator 47, where the rear rotors would be set at a ninety degree angle relative to the front rotors 41,42. The rear rotors would be functionally connected to the rotor shaft 43 and the pitch adjustment device 50 such that their rotor direction and pitch adjustment would be changed in a similar manner as rotors 41,42. Thus, rear rotors would harness the kinetic energy of the back flowing water, adding additional rotational mechanical energy to the rotor shaft 43, where the four rotors are set at ninety degrees to each other from front view.

The present invention may, of course, be carried out in ways other than those herein set forth without parting from the spirit and essential characteristics of the invention. The present embodiments are therefore to be considered in all respects as illustrative and not restrictive, and all changes coming within the meaning and equivalency range of the appended claims are intended to be embraced therein.

What is claimed is:

1. A submersible electrical power generating system including a generator means for generating electricity having a support means for positioning and maintaining said generating system in a flowing water current, comprising: a rotor blade means, oriented about a horizontal axis for rotation parallel to said water current where kinetic energy in said water current causes said rotor blade means to turn converting said kinetic energy into rotation mechanical energy, where said rotor blade means is functionally connected to a rotor shaft forming at its center the axis of rotation where one end of said rotor shaft is functionally connected to said generator means for transferring said rotational mechanical energy, and said rotor shaft has at another end a perpendicular pivotal support axial pivotally supporting said rotor blade means in a manner that a blade direction of said rotor blade means and a blade pitch of said rotor blade means can be adjusted by pivoting said rotor blade means around said pivotal support axial, where said blade direction and said blade pitch are adjusted by a microprocessor control center means configured: to get from a look-up table means stored in a RAM memory means of said microprocessor control center means an assigned blade direction for said rotor blade means and an assigned blade pitch for said rotor blade means; to determine if it is time for an adjustment of said blade direction of said rotor blade means and said blade angle of said rotor blade means; to get a real-time blade direction and a real-time blade pitch and compare to said assigned blade direction and to said assigned blade pitch; and to sequentially change said real-time blade direction and said real-time blade pitch to equal said assigned blade direction and said assigned blade pitch by reversing said blade pitch, increasing said blade pitch, or decreasing said blade pitch, wherein a data point corresponding to slack tide in said look-up table means causes said microprocessor control center means to reverse said real-time blade direction.

2. A method for generating electricity with a submersible electrical generating system functionally connected to generator means for generating electricity having a support means for positioning and maintaining said generating system in a flowing water current, wherein the method comprises the following steps:
  a. harnessing the kinetic energy of said flowing water current by placing said generating system parallel to said water current, where said generating system includes a rotor blade means having a front edge and a trailing edge;
  b. attaching said rotor blade means to a rotor shaft through a perpendicular pivotal support axial in a manner that said rotor blade means can be pivoted around said pivotal support axial for adjusting a blade direction of said rotor blade means and a blade pitch of said rotor blade means with respect to said rotor shaft;
  c. controlling said blade direction and said blade pitch of said rotor blade means by a microprocessor control center-means configured to: receive from a down-load communication means a look-up table means, which is stored in a RAM memory means and includes assigned blade direction data and assigned blade pitch data corresponding to predicted times listed in a tidal chart; retrieve from said RAM memory means said assigned blade direction data and said assigned blade pitch data and determine if it is time to adjust said blade direction and said blade pitch; get a real-time blade direction and a real-time blade pitch; and sequentially change said real-time blade direction and said real-time blade pitch by reversing blade pitch, increasing blade pitch, or decreasing blade pitch such that said real-time blade direction and said real-time blade pitch equal said assigned blade direction and said assigned blade pitch; and
  d. transferring said rotational mechanical energy to said generator means, functionally connected to said generating system, for generating electricity.

3. The method as recited in claim 2, wherein said assigned blade direction data in said look-up table means corresponds to a predicted time for a slack tide taken from a tidal table.

4. The method as recited claim 2, wherein said microprocessor control center means is further configured to receive a command to set said real-time blade pitch at zero degrees during violent weather where said zero degrees corresponds to a position of said rotor blade means being positioned exactly parallel to said rotor shaft.

5. A method for generating electricity with a submersible electrical power generating system which includes a generator means for generating electricity having a support means for positioning and maintaining said generating system in a water current, the method comprises the steps of:
  a. harnessing the kinetic energy of flowing water by placing said generating system parallel to said water current, where said generating system is functionally connected to a rotor blade means having a base of width W, a leading edge, a rotor tip and a trailing edge, where said leading edge begins at a front end of said base and extends to said tip, and said trailing edge begins at said tip and continues to a back end of said base, where said leading edge and trailing edge are defined by an elliptical curve means;
  b. connecting said rotor blade means to a rotor shaft through a perpendicular pivotal support axial such that said rotor blade means can be pivoted around said pivotal support axial adjusting to a blade direction and a blade pitch of said rotor blade means;
  c. adjusting said blade direction and said blade pitch of said rotor blade means relative to said rotor shaft at an angle to cause said rotor blade means to turn when flowing water strikes said leading edge flowing back to said trailing edge thereby converting the kinetic energy of the flowing water into rotational mechanical energy;
  d. controlling said blade direction and said blade pitch of said rotor blade means by a microprocessor control center means configured to: receive a look-up table means including assigned blade direction data for reversing said blade direction and assigned blade pitch data for setting said blade pitch wherein said assigned blade direction data and said assigned blade pitch data correspond to predicted times listed in tidal charts, store said look-up table means in a storage means, and retrieve said look-up table means from said storage means and determine if it is time for an adjustment in said blade direction and said blade pitch; get a real-time blade direction and a real-time blade pitch; and change said real-time blade direction and said real-time blade pitch by reversing said blade pitch, increasing said blade pitch, or increasing said blade pitch to equal said assigned blade direction and said assigned blade pitch.

6. A microprocessor control center means for controlling the operation of an electrical power system for generating electricity in a flowing water current, said electrical power system having a rotatable rotor blade means pivotally attached to a perpendicular support axial, wherein said rotor blade means has a blade direction and an angular blade pitch which are controlled by said microprocessor control center means, which comprises: a down-load communication means for receiving a look-up table means which include data points for an assigned blade direction and data points for an assigned blade pitch which correspond to a predicted current pattern taken from a tidal chart where said look-up table means is stored in a RAM memory means, and said microprocessor control center means has a processor means which includes an input pathway to receive input signals including said data points from said look-up table means, wherein said processor means determines if it is time for an adjustment in said blade direction and said blade pitch, and thereafter said processor means gets a real-time blade direction and a real-time blade pitch and sequentially generates an output signal which changes said real-time blade direction and said real-time blade pitch to equal said assigned blade direction and said assigned blade pitch.

7. The microprocessor control center means as recited in claim 6, wherein said microprocessor control center means includes a computer program which includes code for instructing said processor means to accept said input signal and to determine if it is time for a blade direction and blade pitch adjustment, and code for instructing said processor means to generate said output signal to change said real-time blade direction and said real-time blade pitch to equal said assigned blade direction and said assigned blade pitch by either reversing said blade pitch, decreasing said blade pitch, or increasing said blade pitch.

* * * * *